US009565160B2

(12) United States Patent
Previdi et al.

(10) Patent No.: US 9,565,160 B2
(45) Date of Patent: Feb. 7, 2017

(54) ADVERTISEMENT OF ADJACENCY SEGMENT IDENTIFIERS

(71) Applicant: Cisco Technology, Inc., San Jose, CA (US)

(72) Inventors: Stefano B. Previdi, Rome (IT); Clarence Filsfils, Bruselles (BE); Ahmed R. Bashandy, Milppitas, CA (US); David D. Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/205,245

(22) Filed: Mar. 11, 2014

(65) Prior Publication Data

US 2014/0317259 A1 Oct. 23, 2014

Related U.S. Application Data

(63) Continuation-in-part of application No. 14/047,310, filed on Oct. 7, 2013.

(Continued)

(51) Int. Cl.
*H04L 12/721* (2013.01)
*H04L 29/12* (2006.01)
*H04L 12/751* (2013.01)
*H04L 12/717* (2013.01)
*H04L 12/723* (2013.01)

(52) U.S. Cl.
CPC ............. *H04L 61/30* (2013.01); *H04L 45/02* (2013.01); *H04L 45/38* (2013.01); *H04L 45/42* (2013.01); *H04L 45/44* (2013.01); *H04L 45/50* (2013.01); *H04L 45/34* (2013.01)

(58) Field of Classification Search
USPC ........................................................ 709/223
See application file for complete search history.

(56) References Cited

U.S. PATENT DOCUMENTS 6,032,197 A  2/2000 Birdwell ........................ 709/216
6,374,303 B1  4/2002 Armitage et al. ............ 709/242
(Continued)

OTHER PUBLICATIONS

Cisco system.INC. "Introduction to intermediate system-to-intermediate system protecol" published 1992-2005: 25 pages.*

(Continued)

*Primary Examiner* — Charles C Jiang
*Assistant Examiner* — Kyaw Z Soe
(74) *Attorney, Agent, or Firm* — Campbell Stephenson LLP

(57) ABSTRACT

Various techniques can be used to advertise adjacency segment identifiers (IDs) within a segment routing (SR) network. For example, a method, performed by a first node, can involve identifying an adjacency segment between a first node and a second node; assigning an identifier to the adjacency segment; and sending an Intermediate-System-to-Intermediate-System (IS-IS) hello (IIH) message to another node. The adjacency advertisement includes the identifier. If the adjacency segment is part of a LAN, the IIH message can be sent to a designated node that aggregates adjacency segment ID advertisements for the other nodes on the LAN.

20 Claims, 7 Drawing Sheets

Related U.S. Application Data

(60) Provisional application No. 61/776,463, filed on Mar. 11, 2013.

(56) References Cited

U.S. PATENT DOCUMENTS

| | | | |
|---|---|---|---|
| 6,577,600 B1 | 6/2003 | Bare | 370/238 |
| 6,647,428 B1 | 11/2003 | Bannai et al. | 709/224 |
| 6,963,570 B1 | 11/2005 | Agarwal | 370/310.2 |
| 7,023,846 B1 | 4/2006 | Andersson et al. | 370/389 |
| 7,031,253 B1 | 4/2006 | Katukam et al. | 370/222 |
| 7,031,607 B1 | 4/2006 | Aswood Smith | 398/51 |
| 7,061,921 B1 | 6/2006 | Sheth | 370/395.52 |
| 7,068,654 B1 | 6/2006 | Joseph et al. | 370/392 |
| 7,072,346 B2 | 7/2006 | Hama | 370/395.53 |
| 7,088,721 B1 | 8/2006 | Droz et al. | 370/395.1 |
| 7,154,416 B1 | 12/2006 | Savage | 341/51 |
| 7,174,387 B1 | 2/2007 | Shand et al. | 709/238 |
| 7,180,887 B1 | 2/2007 | Schwaderer | 370/351 |
| 7,260,097 B2 | 8/2007 | Casey | 370/392 |
| 7,286,479 B2 | 10/2007 | Bragg | 370/225 |
| 7,330,440 B1 | 2/2008 | Bryant | 370/254 |
| 7,359,377 B1* | 4/2008 | Kompella | H04L 45/50 370/254 |
| 7,420,992 B1 | 9/2008 | Fang | 370/477 |
| 7,430,210 B2 | 9/2008 | Havala et al. | 370/395.53 |
| 7,463,639 B1 | 12/2008 | Rekhter | 370/409 |
| 7,466,661 B1* | 12/2008 | Previdi | H04L 45/02 370/254 |
| 7,471,669 B1 | 12/2008 | Sabesan et al. | 370/351 |
| 7,564,803 B1 | 7/2009 | Minei et al. | 370/254 |
| 7,577,143 B1 | 8/2009 | Kompella | 370/392 |
| 7,602,778 B2 | 10/2009 | Guichard et al. | 370/389 |
| 7,610,330 B1 | 10/2009 | Quinn | 709/201 |
| 7,773,630 B2 | 8/2010 | Huang et al. | 370/474 |
| 7,817,667 B2 | 10/2010 | Frederiksen et al. | 370/474 |
| 7,885,259 B2 | 2/2011 | Filsfils | 370/389 |
| 7,885,294 B2 | 2/2011 | Patel | 370/202 |
| 7,894,352 B2 | 2/2011 | Kompella et al. | 370/248 |
| 7,894,458 B2 | 2/2011 | Jiang | 370/401 |
| 7,940,695 B1 | 5/2011 | Bahadur | 370/254 |
| 7,983,174 B1 | 7/2011 | Monaghan | 370/242 |
| 8,064,441 B2 | 11/2011 | Wijnands et al. | 370/389 |
| 8,339,973 B1 | 12/2012 | Pichumani | 370/248 |
| 8,422,514 B1 | 4/2013 | Kothari et al. | 370/466 |
| 8,542,706 B2 | 9/2013 | Wang et al. | 370/474 |
| 8,711,883 B2 | 4/2014 | Kang | 370/389 |
| 8,792,384 B2* | 7/2014 | Banerjee | H04L 45/026 370/254 |
| 8,953,590 B1 | 2/2015 | Aggarwal | 370/389 |
| 9,036,474 B2 | 5/2015 | Dibirdi et al. | 370/235 |
| 9,112,734 B2 | 8/2015 | Edwards et al. | |
| 9,118,572 B2 | 8/2015 | Sajassi et al. | |
| 2001/0037401 A1 | 11/2001 | Soumiya | 709/232 |
| 2002/0103732 A1 | 8/2002 | Bundy et al. | 705/35 |
| 2003/0016678 A1 | 1/2003 | Maeno | 370/400 |
| 2003/0026271 A1 | 2/2003 | Erb et al. | 370/401 |
| 2003/0126272 A1 | 7/2003 | Corl et al. | 709/230 |
| 2003/0142674 A1 | 7/2003 | Casey | 370/393 |
| 2003/0231634 A1 | 12/2003 | Henderson | 370/395.32 |
| 2004/0160958 A1 | 8/2004 | Oh | 370/395.1 |
| 2004/0174879 A1 | 9/2004 | Basso et al. | 370/392 |
| 2004/0196840 A1 | 10/2004 | Amrutur et al. | 370/389 |
| 2005/0213513 A1 | 9/2005 | Ngo | 370/254 |
| 2005/0259655 A1 | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |
| 2006/0075134 A1 | 4/2006 | Aalto | 709/238 |
| 2006/0080421 A1 | 4/2006 | Hu | 709/223 |
| 2006/0092940 A1 | 5/2006 | Ansari | 370/392 |
| 2006/0262735 A1 | 11/2006 | Guichard | 370/254 |
| 2006/0274716 A1 | 12/2006 | Oswal et al. | 370/349 |
| 2007/0019647 A1* | 1/2007 | Roy | H04L 45/12 370/392 |
| 2007/0053342 A1 | 3/2007 | Slereckl | 370/351 |
| 2007/0058638 A1 | 3/2007 | Guichard et al. | 370/395.31 |
| 2007/0189291 A1 | 8/2007 | Tian | 370/390 |
| 2007/0245034 A1* | 10/2007 | Retana | H04L 45/02 709/238 |
| 2008/0002699 A1 | 1/2008 | Rajsic | 370/392 |
| 2008/0075016 A1* | 3/2008 | Ashwood-Smith | H04L 45/02 370/252 |
| 2008/0075117 A1 | 3/2008 | Tanaka | 370/471 |
| 2008/0084881 A1* | 4/2008 | Dharwadkar | H04L 12/4641 370/392 |
| 2008/0101227 A1* | 5/2008 | Fujita | H04L 45/12 370/232 |
| 2008/0101239 A1 | 5/2008 | Good | 370/235 |
| 2008/1010227 | 5/2008 | Fujita et al. | 370/232 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.53 |
| 2008/0225864 A1* | 9/2008 | Aissaoui | H04L 12/4633 370/401 |
| 2008/0253367 A1 | 10/2008 | Ould-Brahim | 370/389 |
| 2008/0259820 A1* | 10/2008 | White | H04L 45/02 370/255 |
| 2009/0041038 A1 | 2/2009 | Martini | 370/401 |
| 2009/0080431 A1 | 3/2009 | Rekhter | 370/392 |
| 2009/0135815 A1 | 5/2009 | Pacella | 370/389 |
| 2010/0063983 A1 | 3/2010 | Groarke et al. | 707/803 |
| 2010/0088717 A1 | 4/2010 | Candelore | 725/32 |
| 2010/0124231 A1 | 5/2010 | Kompella | 370/40 |
| 2010/0142548 A1 | 6/2010 | Sheth | 370/410 |
| 2010/0220739 A1 | 9/2010 | Ishiguro | 370/401 |
| 2010/0232435 A1 | 9/2010 | Jabr | 370/392 |
| 2010/0284309 A1 | 11/2010 | Allan et al. | 370/256 |
| 2011/0228780 A1 | 9/2011 | Ashwood-Smith | 370/392 |
| 2011/0268114 A1 | 11/2011 | Wijnands et al. | 370/389 |
| 2011/0273980 A1* | 11/2011 | Ashwood Smith | H04L 45/00 370/225 |
| 2011/0280123 A1 | 11/2011 | Wijnands et al. | 370/228 |
| 2011/0286452 A1 | 11/2011 | Balus | 370/390 |
| 2012/0044944 A1 | 2/2012 | Kotha et al. | 370/401 |
| 2012/0069740 A1 | 3/2012 | Lu et al. | 370/238 |
| 2012/0069845 A1 | 3/2012 | Carnet et al. | 370/392 |
| 2012/0082034 A1 | 4/2012 | Vasseur | 370/235 |
| 2012/0120808 A1 | 5/2012 | Nandagopal et al. | 370/238 |
| 2012/0213225 A1 | 8/2012 | Subramanian et al. | 370/392 |
| 2012/0218884 A1 | 8/2012 | Kini | 370/228 |
| 2012/0307629 A1 | 12/2012 | Vasseur | 370/228 |
| 2013/0003728 A1 | 1/2013 | Kwong et al. | 370/389 |
| 2013/0077476 A1 | 3/2013 | Enyedi | 370/225 |
| 2013/0077626 A1 | 3/2013 | Keesara et al. | 370/390 |
| 2013/0142052 A1 | 6/2013 | Burbidge | 370/242 |
| 2013/0188634 A1* | 7/2013 | Magee | H04L 12/462 370/389 |
| 2013/0219034 A1 | 8/2013 | Wang | 709/222 |
| 2013/0258842 A1 | 10/2013 | Mizutani | 370/228 |
| 2013/0266012 A1 | 10/2013 | Dutta | 370/392 |
| 2013/0266013 A1 | 10/2013 | Dutta et al. | 370/392 |
| 2013/0343204 A1 | 12/2013 | Geib et al. | 370/248 |
| 2014/0098675 A1 | 4/2014 | Frost et al. | 370/241.1 |
| 2014/0169370 A1 | 6/2014 | Filsfils et al. | 370/392 |
| 2014/0177638 A1 | 6/2014 | Bragg et al. | 370/395.3 |
| 2014/0254596 A1 | 9/2014 | Filsfils et al. | 370/392 |
| 2014/0269266 A1 | 9/2014 | Filsfils et al. | 370/228 |
| 2014/0269421 A1 | 9/2014 | Previdi et al. | 370/254 |
| 2014/0269422 A1 | 9/2014 | Filsfils et al. | 370/254 |
| 2014/0269698 A1 | 9/2014 | Filsfils et al. | 370/389 |
| 2014/0269699 A1 | 9/2014 | Filsfils et al. | 370/389 |
| 2014/0269721 A1 | 9/2014 | Bashandy et al. | 370/392 |
| 2014/0269725 A1 | 9/2014 | Filsfils et al. | 370/392 |
| 2014/0269727 A1 | 9/2014 | Filsfils et al. | 370/392 |
| 2014/0286195 A1 | 9/2014 | Fedyk | 370/254 |
| 2014/0317259 A1 | 10/2014 | Previdi et al. | 709/223 |
| 2014/0341222 A1 | 11/2014 | Filsfils et al. | 370/395.5 |
| 2014/0369356 A1 | 12/2014 | Bryant et al. | 370/392 |

OTHER PUBLICATIONS

Francois, Pierre Jean Rene; "Loop Avoidance During Network Convergence In Switched Networks"; U.S. Appl. No. 14/319,353,

(56) References Cited

OTHER PUBLICATIONS filed Jun. 30, 2014; consisting of Specification, Claims and Abstract (29 pages); and Drawings (6 sheets).
Previdi, Stefano B.; "Segement Routing Using a Remote Forwarding Adjacency Identifier"; U.S. Appl. No. 14/334,300, filed Jul. 17, 2014; consisiting of Specification, Claims and Abstract (23 pages); and Drawings (8 sheets).
Previdi, Stefano B; "Segment Routing Extension Headers"; U.S. Appl. No. 14/212,084, filed Mar. 14, 2014; consisting of Specification, Claims and Abstract (43 pages); and Drawings (17 sheets).
Aggarwal, R., et al., Juniper Networks; E. Rosen, Cisco Systems, Inc.; "MPLS Upstream Label Assignment and Context Specific Label Space;" Network Working Group; Internet Draft; Jan. 2005; pp. 1-8.
Awduche, Daniel O., et al., "RSVP-TE: Extensions to RSVP for LSP Tunnels," Network Working Group, Internet-Draft, Aug. 2000, pp. 1-12.
Awduche, Daniel O., et al., "RSVP-TE: Extensions to RSVP for LSP Tunnels," Network Working Group, Request for Comments 3209, Dec. 2001, pp. 1-61.
Backes, P. and Rudiger Geib, "Deutsche Telekom AG's Statement About IPR Related to Draft-Geig-Spring-OAM-Usecase-01," Feb. 5, 2014, pp. 1-2.
Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.
Bryant, S., et al., Cisco Systems, "Remote LFA FRR," draft-ietf-rtgwg-remote-lfa-04, Network Working Group, Internet-Draft, Nov. 22, 2013, pp. 1-24.
Crabbe, E., et al., "PCEP Extensions for MPLS-TE LSP Protection With Stateful PCE Draft-Crabbe-PCE-Stateful-PCT-Protection-00," Network Working Group, Internet- Draft, Apr. 2013, pp. 1-12.
Crabbe, E., et al., Stateful PCE Extensions for MPLS-TE LSPs, draft-crabbe-pce-statement-pce-mpls-te-00; Network Working Group, Internet-Draft, Apr. 15, 2013, pp. 1-15.
Deering, S., et al., Cisco, Internet Protocol, Version 6 (IPv6) Specification, Network Working Group, Request for Comments 2460, Dec. 1998, pp. 1-39.
Farrel, A., et al., Old Dog Consulting, A Path Computation Element (PCE)—Based Architecture, Network Working Group, Request for Comments 4655, Aug. 2006, pp. 1-80.
Farrel, A., et al., Old Dog Consulting, Inter-Domain MPLS and GMPLS Traffic Engineering—Resource Reservation Protocol-Traffic Enginerring (RSVP-TE) Extensions, Network Working Group, Request for Comments 5151, Feb. 2008, pp. 1-25.
Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.
Filsfils, C., et al., Cisco Systems, Inc., "Segment Routing Architecture," draft-filsfils-rtgwg-segment-routing-00, Jun. 28, 2013, pp. 1-28.
Filsfils, C., et al., Cisco Sytems, Inc., "Segment Routing Architecture," draft-filsfils-rtgwg-segment-routing-01, Network Working Group, Internet-Draft, Oct. 21, 2013, pp. 1-28.
Filsfils, C. et al., Cisco Systems, Inc., "Segment Routing Interoperability with LDP", draft-filsfils-spring-segment-routing-ldp-interop-01.txr; Apr. 18, 2014, pp. 1-16.
Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.
Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-22.
Frost, D., et al., Cisco Systems, Inc., "MPLS Generic Associated Channel (G-Ach) Advertisement Protocol," Request for Comments 7212, Jun. 2014, pp. 1-23.
Geib, R., "Segment Routing Based OAM Use Case,"IETF 87, Berlin, Jul./Aug. 2013, pp. 1-3.
Geib, R., Deutsch Telekom, "Use Case for a Scalable and Topology Aware MPLS data plan moniotoring System," draft-geib-spring-oam-usecase-00; Internet-Draft, Oct. 17, 2013, pp. 1-11.
Geib, R., Deutsch Telekom, "Use Case for a Scalable and Topology Aware MPLS Data Plan Monitoring System," draft-geib-spring-oam-usecase-01; Internet-Draft, Feb. 5, 2014, pp. 1-10.
Gredler, H., et al., Juniper Networks, Inc., "Advertising MPLS Labels in IS-IS draft-gredler-isis-label-advertisement-00," Internet-Draft; Apr. 5, 2013; pp. 1-13.
Gredler, H. et al., hannes@juniper.net, IETF87, Berlin, "Advertising MPLS LSPs in the IGP," draft-gredler-ospf-label-advertisement, May 21, 2013; pp. 1-14.
Guilbaud, Nicolas and Ross Cartlidge, "Google-Localizing Packet Loss in a Large Complex Network," Feb. 5, 2013, pp. 1-43.
Imaizumi, H., et al.; Networks, 2005; "FMEHR: An Alternative Approach to Multi-Path Forwarding on Packed Switched Networks," pp. 198-201.
Kompella, K. et al, Juniper Networks, "Label Switched Paths (LSP) Hierarchy with Generalized Multi-Protocol Label Switching (GMPLS) Traffic Enginerring (TE)," Network Working Group, Request for Comments 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.
Kompella, K. et al., Juniper Networks,"Virtual Private LAN Service (VPLS) Using BGP for Auto-Discovery and Signaling," Network Working Group, Request for Comments 4761, Jan. 2007, pp. 1-28.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplane," draft-kumarkini-mpls-spring-lsp-ping-00, Network Work Group, Internet-Draft, Jan. 2, 2014, pp. 1-15.
Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.
Previdi, S. et al., Cisco Systems, Inc., "Segment Routing with IS-IS Routing Protocol, draft-previdi-filsfils-isis-segment-routing-02," Internet-Draft, Mar. 20, 2013, A55 pp. 1-27.
Raszuk, R., NTT I3, "MPLS Domain Wide Labels," draft-raszuk-mpls-domain-wide-labels-00, MPLS Working Group, Internet-Draft, Jul. 14, 2013, pp. 1-6.
Rosen, E. et al., Cisco Systems, Inc., "BGP/MPLS VPNs", Network Working Group, Request for Comments: 2547; Mar. 1999, pp. 1-26.
Sivabalan, S., et al.; "PCE-Initiated Traffic Engineering Path Setup in Segment Routed Networks; draft-sivabalan-pee-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.
Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.
Vasseur, JP, et al.; Cisco Systems, Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.
Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.
Li, T., et al., Redback Networks, Inc., "IS-IS Extensions for Traffic Engineering," Network Working Group, Request for Comments 5305, Oct. 2008, 17 pages.
Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.

(56) References Cited

OTHER PUBLICATIONS

Eckert, Toerless et al., "Traffic Engineering for Bit Indexed Explicit Replication", U.S. Appl. No. 14/814,575, filed Jul. 31, 2015; consisting of Specification, Claims, and Abstract (75 pages); and Drawings (18 sheets).

Eckert, Toerless et al., "Traffic Engineering for Bit Indexed Explicit Replication", U.S. Appl. No. 14/862,915, filed Sep. 23, 2015; consisting of Specification, Claims, and Abstract (75 pages); and Drawings (18 sheets).

Eckert, T., "Traffic Engineering for Bit Index Explicit Replication BIER-TE, draft-eckert-bier-te-arch-00," Network Working Group, Internet-Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.

Eckert, Toerless et al., "Failure Protection for Traffic-Engineered Bit Indexed Explicit Replication", U.S. Appl. No. 15/054,480, filed Feb. 26, 2016; consisting of Specification, Claims, Abstract, and Drawings (76 pages).

Alcatel-Lucent, "Segment Routing and Path Computation Element—Using Traffic Engineering to Optimize Path Placement and Efficiency in IP/MPLS Networks"; Technology White Paper; 2015; 28 pages.

Awduche, D. et al., "Requirements for Traffic Engineering Over MPLS"; Network Working Group; Request for Comments: 2702; Sep. 1999; pp. 1-29.

Awduche, D. et al., "Overview and Principles of Internet Traffic Engineering"; Network Working Group; Request for Comments: 3272; May 2002; pp. 1-71.

Filsfils, C. et al., "Segment Routing Architecture"; draft-ietf-spring-segment-routing-07; Network Working Group, Internet-Draft; Dec. 15, 2015; pp. 1-24.

Filsfils, C. et al., "Segment Routing Use Cases", draft-filsfils-rtgwg-segment-routing-use-cases-02; Network Working Group; Internet-Draft; Oct. 21, 2013; pp. 1-36.

Previdi, S. et al., "IS-IS Extensions for Segment Routing"; draft-ietf-isis-segment-routing-extensions-06; IS-IS for IP Internets, Internet-Draft; Dec. 14, 2015; pp. 1-39.

Psenak, P., et al. "OSPF Extensions for Segment Routing", draft-ietf-ospf-segment-routing-extensions-05; Open Shortest Path First IGP; Internet-Draft; Jun. 26, 2015; pp. 1-29.

Psenak, Peter et al., "Enforcing Strict Shortest Path Forwarding Using Strict Segment Identifiers" U.S. Appl. No. 15/165,794, filed May 26, 2016; consisting of Specification, Claims, Abstract, and Drawings (52 pages).

* cited by examiner

| Node 1 | Node 2 | Adj Seg ID 501 |
| Node 1 | Node 3 | Adj Seg ID 502 |
| Node 2 | Node 1 | Adj Seg ID 503 |
| Node 3 | Node 1 | Adj Seg ID 504 |

500

ADVERTISEMENT OF ADJACENCY SEGMENT IDENTIFIERS

RELATED APPLICATIONS

This application claims the domestic benefit under Title 35 of the United States Code §119(e) of U.S. Provisional Patent Application Ser. No. 61/776,463, entitled "Segment Routing," filed Mar. 11, 2013, which is hereby incorporated by reference in its entirety and for all purposes as if completely and fully set forth herein. This application is also a continuation-in-part of U.S. patent application Ser. No. 14/047,310, entitled "Segment Routing Techniques," filed Oct. 7, 2013, which in turn claims priority to U.S. Provisional Patent Application Ser. No. 61/710,121 entitled "Methods for Using Chain Routing," filed Oct. 5, 2012, both of which are hereby incorporated by reference in their entirety and for all purposes as if completely and fully set forth herein

FIELD OF THE INVENTION

This invention relates to networking and, more particularly, to distributing information describing a network within that network.

DESCRIPTION OF THE RELATED ART

Message forwarding is a process of relaying messages from one communication link to another by nodes in a network. A message is a formatted unit of data that typically contains control information and payload data. Control information may include: source and destination IP addresses, error detection codes like checksums, sequencing information, etc. Control information is typically found in message headers and trailers, with payload data in between.

At network nodes where multiple outgoing links are available, the choice of link to use for message forwarding requires a decision process that, while simple in concept, can be complex. Since message forwarding decisions are handled by nodes, the total time required for this can become a major limiting factor in overall network performance.

Label Distribution Protocol (LDP) is a mechanism where network nodes (e.g., routers) capable of Multiprotocol Label Switching (MPLS) exchange labels with their neighbors. These labels can be subsequently attached to messages and used by nodes to make message forwarding decisions. For purposes of explanation only, nodes that make message forwarding decisions based on labels will be referred to as LDP nodes. Message forwarding based on labels stands in stark contrast to traditional Internet Protocol (IP) routing in which message forwarding decisions are made using IP addresses contained within messages. Because LDP nodes use labels, there is no need for LDP nodes to examine the contents (e.g., IP addresses) of messages to make message forwarding decisions.

BRIEF DESCRIPTION OF THE DRAWINGS

The present disclosure may be better understood, and its numerous objects, features, and advantages made apparent to those skilled in the art by referencing the accompanying drawings.

Figure 1:
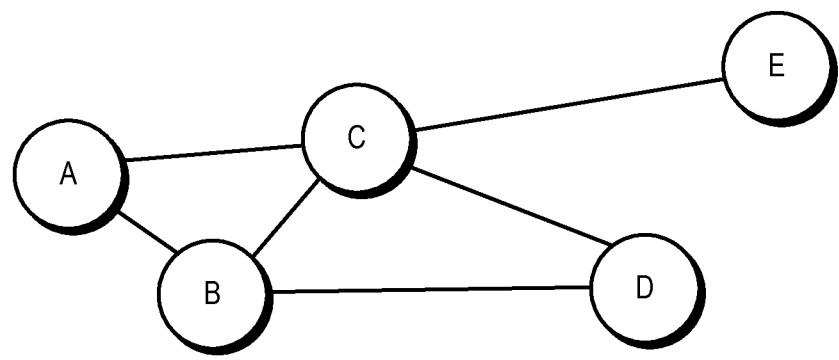
FIG. 1 is a block diagram illustrating an example network, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

IP routing and Multiprotocol Label Switching (MPLS) are distinct message forwarding mechanisms. IP routing uses IP addresses inside message headers to make forwarding decisions. In contrast, LDP nodes (i.e., nodes employing MPLS) can make forwarding decisions using short path identifiers called labels that are attached to messages. Segment routing (SR) is yet another mechanism that can be employed. SR is similar to MPLS in many regards. For example, forwarding decisions in SR can be based on short path identifiers called segment IDs that are attached to messages. However, substantial differences exist between SR and MPLS, as will be more fully described below.

IP routing uses routing tables that maintain forwarding information to various destinations. In one embodiment, when a message arrives at a node, the node can use the destination IP address in the message header to access a routing table and lookup corresponding forwarding information such as an egress interface, which is the interface or port to be used to forward the message to the next node on a path to the message's final destination. After the message is forwarded the next node performs its own routing table lookup using the same destination IP address, and so on.

MPLS is commonly employed in provider networks or networks that provide message transport and other services for customers. Messages enter an MPLS provider network via an ingress provider edge (PE) node, travel hop-by-hop along a label-switched path (LSP) that includes one or more core nodes, and exit the provider network via an egress PE node.

Messages are forwarded along an LSP based on LDP forwarding tables and labels attached to messages. Labels allow for the use of very fast and simple forwarding engines in the dataplane of LDP nodes. Another benefit of MPLS is the elimination of dependence on a particular Open Systems Interconnection (OSI) model data link layer technology to forward messages.

A label is a short, fixed-length, locally significant identifier that can be associated with a forwarding equivalence class (FEC). Messages associated with the same FEC should follow the same LSP through the provider network. LSPs can be established for a variety of purposes, such as to guarantee a certain level of performance when transmitting messages, to forward messages around network congestion, to create IP tunnels for network-based virtual private networks, etc. In many ways, LSPs are no different than circuit-switched paths in ATM or Frame Relay networks, except that they are not dependent on a particular Layer 2 technology.

LDP is employed in the control plane of LDP nodes. Two nodes, called LDP peers, exchange label mapping information on a FEC by FEC basis. The exchange of information can be bi-directional. LDP generates labels for, and exchanges labels between, peer nodes. LDP can be used to build and maintain LDP forwarding tables that map labels and node interfaces. These forwarding tables can be subsequently used by nodes to forward messages through MPLS networks as more fully described below.

When a message is received by an ingress PE node of an MPLS network, the ingress PE node may determine a corresponding FEC. Characteristics for determining the FEC for a message can vary, but typically the determination is based on the message's destination IP address. Quality of Service for the message may also be used to determine the FEC. Once determined, the ingress PE node can access a table to select a label that is mapped to the FEC. The table may also map an egress interface to the FEC. Before the ingress PE node forwards the message via the egress interface, the ingress PE node pushes or attaches the label to the message.

A message with attached label can be forwarded along an LSP, and nodes in the LSP can make forwarding decisions based on labels. To illustrate, when an LDP node receives a message with an attached label (i.e., incoming label), an LDP forwarding table in the node can be accessed to read an egress interface and a label (i.e., an outgoing label) mapped to the incoming label. Before the message is forwarded via the egress interface, the node may swap the incoming label with the outgoing label. The next hop receives the message and attached label and may perform the same process. This process is often called hop-by-hop forwarding along a non-explicit path. The egress PE node in the LSP may pop or remove an incoming label before the message is forwarded to a customer.

Segment Routing

Segment routing (SR), which can also be referred to as chain routing (CR), is a mechanism in which messages can be forwarded using SR forwarding tables and segment IDs attached to messages. Like MPLS, SR enables very fast and simple forwarding engines in the dataplane of nodes. SR is not dependent on a particular Open Systems Interconnection (OSI) model data link layer technology to forward messages.

SR nodes (i.e., nodes employing SR) are similar to LDP nodes in many ways. Since most SR nodes make forwarding decisions based on segment IDs as opposed to labels, however, SR nodes need not employ LDP in their control planes. Unless otherwise indicated, an SR node lacks LDP in the control plane. Additional differences can exist between SR nodes and LDP nodes.

SR can be employed in provider networks. Messages enter an SR enabled provider network via an ingress provider edge (PE) node, travel hop-by-hop along a segment-switched path (SSP) that includes one or more core nodes, and exit the provider network via an egress PE node. Much of the remaining disclosure will make reference to an autonomous, provider network that operates under one administrative domain, although SR can be employed over multiple administrative domains as well. In general a provider network may contain a contiguous set of nodes.

Like labels, segment IDs are short (relative to an IP address or a FEC), fixed-length identifiers. Segment IDs may correspond to topological segments of a provider network or services provided by nodes thereof. Topological segments can be one-hop paths to SR nodes, or they can be multi-hop paths to SR nodes. Topological segments act as sub-paths that can be combined to form an SSP. Stacks of segment IDs can represent SSPs, as will be described below. Like LSPs, SSPs can be associated with FECs. Thus segment ID stacks may correspond to FECs.

There are several types of segment IDs, including but not limited to: nodal-segment IDs, adjacency-segment IDs, and service-segment IDs. A nodal-segment ID represents a one-hop or a multi-hop path within the provider network to an associated SR node. Nodal-segment IDs are assigned to respective SR nodes within the provider network so that no two SR nodes in the provider network are assigned the same nodal-segment ID. In one embodiment, all assigned nodal-segment IDs are selected from a predefined ID range (e.g., [64, 5000]) for the provider network. The range for nodal-segment IDs may be different from a predefined range for labels.

Nodal-segment IDs can be assigned to SR nodes, in some embodiments, by a path computation element (PCE) server. When an SR node is powered on, the SR node can send a query to the PCE server requesting a nodal-segment ID. In response, the PCE server can respond with an appropriate identifier from the predefined ID range. The PCE server can maintain a record (e.g., in a data structure in memory, in a file on a hard drive, and the like) that indicates which nodes have been assigned nodal-segment IDs. If the requesting SR node has not already been assigned a nodal-segment ID, the PCE server can select an unused ID from the ID range, send a response containing the selected ID, and update the record to show that the requesting node has been assigned the selected ID. If the requesting SR node has already been assigned a nodal-segment ID (e.g., before being powered down), the PCE server can access the record to obtain the already-assigned nodal-segment ID and return that ID to the requesting SR node.

Instead of sending IDs in response to requests from SR nodes, the PCE server can alternatively identify that a newly-booted SR node needs a nodal-segment ID and assign (and send) that SR node a nodal-segment ID without having first received a request from that SR node. Similarly, a PCE server can identify that an SR node that already has one or more assigned nodal-segment IDs needs a new nodal-segment ID (in order to provide an alternative path to that SR node) and can thus similarly assign and send the SR node its additional nodal-segment ID.

In addition to providing nodal-segment IDs, the PCE server may, in some embodiments, also specify the type of algorithm to be used when calculating the path identified by that nodal-segment ID. In such embodiments, the SR nodes do not need to be preconfigured with the identity of the particular type of algorithm(s) to use in nodal-segment path calculation.

The SR nodes can map their respectively assigned nodal-segment IDs in memory to unique identifiers. For purposes of explanation only, nodal-segment IDs are mapped to respective node loopback prefix IP addresses. One of ordinary skill understands that node loopback prefix IP addresses (node prefixes for short) distinguish the SR nodes from each other within the provider network. The node prefixes can be used by link state protocols such as open shortest path first (OSPF) or intermediate system to intermediate system (IS-IS), or modifications thereof, operating in the control plane of an SR node to identify egress interfaces for paths to respective SR nodes. Once identified, the appropriate egress interfaces for the paths can be mapped to nodal-segment IDs within an SR forwarding table as the SR forwarding table is created or subsequently updated.

In some embodiments, the link state protocols can calculate paths to SR nodes using a variety of different algorithms. A default path-calculation algorithm (e.g., a Dijkstra shortest path rooted at the SR node to which the path leads) may be used if no specific algorithm is specified; if an algorithm is specified for a particular path, however, all SR nodes will use the same specific algorithm when calculating that path. As described above, each SR node uses the path calculation in order to identify the appropriate egress interface to add to its SR forwarding table for a given nodal-segment ID.

In some embodiments, it may be desirable, from a traffic engineering standpoint, for there to be two (or more) different nodal segments leading to the same SR node. In such embodiments, that SR node can be assigned two different nodal-segment IDs (e.g., each of which can then be mapped to a different node prefix). In these situations, the distinct paths are each calculated using a different algorithm. Accordingly, another node can include multiple nodal-segment IDs for segments leading to the same SR node in its SR forwarding table, but each of these nodal-segment IDs may be associated with a different egress interface, which is identified using the specific algorithm used to calculate the respective nodal-segment identified by each nodal-segment ID.

One example of a situation in which it is desirable to have multiple nodal-segments leading to the same SR node involves traffic between two continents. There may be two different undersea cables available to carry this traffic. As such, one nodal-segment can be defined for a path using the first undersea cable (e.g., for standard customers' traffic) and another nodal-segment can be defined for the path using the second undersea cable (e.g., for premium customers' traffic). The first path can be computed using an IS-IS shortest path algorithm while the second can be computed using an algorithm that takes a latency metric into account.

Multiple nodal-segments leading to the same SR node can also be implemented for customers who desire to have multiple disjoint (non-overlapping) paths between customer locations. Here, algorithms that use different exclusion constraints can be used to calculate those disjoint paths.

Service-segment IDs correspond to message services performed by SR nodes such as deep packet inspection (DPI) and/or filtering. Each SR node can assign a distinct service-segment ID for each of the SR node's message services. For the purposes of explanation only, a node will offer no more than one service. Service-segment IDs are locally significant. Like adjacency-IDs, separate SR nodes may assign the same service-segment ID for their respective services. Service-segment IDs can be selected from the same range as the adjacency-segment IDs, or service-segment IDs can selected from a predefined range that is distinct from the ranges for labels, adjacency-segment IDs and/or nodal-segment IDs. The service-segment IDs can be assigned based on service type, it being understood the present disclosure should not be limited thereto. As an example, adjacency-segment ID 5001 is always mapped to deep packet inspection within the provider network, regardless of the node or nodes that perform the service.

An adjacency-segment ID represents a link between adjacent SR nodes. For purposes of explanation only, this disclosure will refer to a link between nodes as an adjacency segment (or simply an adjacency). Adjacencies can be uniquely identified in the provider network. For purposes of explanation only, this disclosure can identify an adjacency identifier (hereafter adjacency-ID) using the node prefixes of nodes between which the adjacency is immediately positioned. To illustrate, for an adjacency between two nodes identified by node prefix X and node prefix Y, the adjacency can be identified herein as adjacency-ID XY. This disclosure will presume that only one adjacency exists between nodes in the provider network, it being understood the present disclosure should not be limited thereto. As such, adjacencies are unique in the provider network of this disclosure. Since adjacencies are unique, it follows that adjacency-IDs are likewise unique. Adjacency-IDs should not be confused with adjacency-segment IDs; adjacency-segment IDs may not be unique within the provider network domain.

Each SR node can assign a distinct adjacency-segment ID for each of the SR node's adjacencies. Separate SR nodes may assign the same adjacency-segment ID. Adjacency-segment IDs, however, are locally significant; separate SR nodes may assign the same adjacency-segment ID, but that adjacency-segment ID represents a different adjacency to each of the assigning nodes. In one embodiment, adjacency-segment IDs are selected from a predefined range that is outside the predefined range for nodal-segment IDs. The predefined range of adjacency-segment IDs may also be outside the predefined range for labels.

SR nodes can advertise (i.e., send to one or more other SR nodes) their nodal-segment IDs, adjacency-segment IDs, service-segment IDs, and node prefixes to other SR nodes in the provider network using a protocol such as interior gateway protocol (IGP) or a modification thereof. More details about how adjacency segment IDs can be advertised are provided below. SR nodes can use the advertised nodal-segment IDs, adjacency-segment IDs, service-segment IDs, node prefixes, and/or other information to create or update SR forwarding tables and/or segment ID stacks.

In one embodiment, the SR nodes can advertise their nodal-segment ID/node prefix pairs, adjacency-segment ID/adjacency-ID pairs, and/or service-segment ID/node prefix pairs. The control planes of an SR node can receive and use the nodal-segment ID/node prefix pairs and a link-state protocol such as IS-IS or OSPF, or modified versions thereof, to identify egress interfaces for paths to SR nodes, using the appropriate algorithms identified (if any) in the advertisements of the nodal-segment to those SR nodes or a default algorithm (e.g., a Dijkstra shortest path rooted at the appropriate SR node). An egress interface, once identified, can be mapped to its respective nodal-segment ID in the node's SR forwarding table.

Nodes also map their adjacency-segment IDs to egress interfaces for respective adjacencies in SR forwarding tables. Because adjacency-segment IDs are locally significant, however, adjacency-segment IDs should only be mapped in SR forwarding tables of the nodes that advertise the adjacency-segment IDs. In other words, an SR node that advertises an adjacency-segment ID/adjacency-ID pair should be the only node in the provider network that has a SR forwarding table that maps the adjacency-segment ID to an egress interface connected to an adjacency identified by the adjacency-ID. Service-segment IDs are also locally significant and should only be mapped in the nodes in which they are advertised. Unlike adjacency-segment IDs, however, service-segment IDs are not mapped to egress interfaces. Rather, the service-segment IDs are mapped to respective services that can be implemented by the node.

Segment Routing (SR) enables segment-switched paths (SSPs), which can be used for transporting packets through the provider network. Like LSPs, SSPs are typically associated with FECs, and can be established for a variety of purposes, such as to guarantee a certain level of performance. Messages associated with the same FEC will typically follow the same SSP of SR nodes through the provider network. Nodes in SSPs make forwarding decisions based on segment IDs, not based on the contents (e.g., destination IP addresses) of messages. As such, message forwarding in SSPs is not dependent on a particular Layer 2 technology.

SR nodes can use nodal-segment IDs, adjacency-segment IDs, and service-segment IDs they receive in advertisements from other SR nodes in order to create ordered lists of segment IDs (i.e., segment ID stacks). Segment ID stacks correspond to SSPs, respectively, that forward messages between nodes (e.g., SR enabled ingress and egress nodes) in the provider network. Segment IDs in a stack may correspond to respective segments or sub paths of a corresponding SSP. When an SR source node (e.g., an SR ingress PE node) receives a message, the node can calculate a FEC for the message in much the same way that LDP ingress PE nodes calculate FECs for messages received from a customer edge router. The SR source node uses the FEC it calculates to select a segment ID stack mapped thereto. The SR source node can add the selected segment ID stack to a header, and then attach the header to the message. The message with attached stack can traverse the segments of the SSP in an order that corresponds to the list order of the segment IDs in the stack. A forwarding engine operating in the dataplane of each SR node can use a segment ID within the stack and an SR forwarding table in order to forward the message and header to the next node in the SSP. As the message and attached header are forwarded along the SSP in a hop-by-hop fashion, the attached stack of segment IDs remains unchanged in one embodiment.

Adjacency Segment ID Advertising

SR nodes can advertise adjacency segment IDs in link state messages such as IS-IS Hello messages. For example, a type length value (TLV) field within an IS-IS Hello (IIH) message that is used to identify adjacencies between nodes can be expanded and/or modified to include an adjacency segment ID assigned by an SR node.

As an example, FIG. 1 shows a simplified block diagram of a network that includes nodes A, B, C, D, and E. Each node is a network device, such as a switch or router, that can forward and/or route messages being sent through the network. In this example, nodes A-E are each configured to implement SR and are interconnected by point-to-point links. Each node can identify the adjacency segment(s) between it and one or more other nodes. For example, node A can identify two adjacency segments: one coupling node A to node B and the other coupling node A to node C. In response to identifying these adjacency segments, node A will assign an adjacency segment ID to each of them, and then advertise these assigned adjacency segment IDs to the other nodes in the network.

Similarly, node B identifies—and assigns adjacency segment IDs to—three adjacency segments: one coupling node B to node A, one coupling node B to node C, and another coupling node B to node D. Node C identifies—and assigns adjacency segment IDs to—four adjacency segments: one coupling node C to node A, one coupling node C to node B, one coupling node C to node D, and a final adjacency segment coupling node C to node E. Node D identifies two adjacency segments: one coupling node D to node B, and another coupling node D to node C. Node D also assigns adjacency segment IDs to these two adjacency segments. Node E similarly identifies one adjacency segment coupling node E to node C and assigns an adjacency segment ID to this adjacency segment. After assigning adjacency segment IDs to one or more adjacency segments, each of nodes B-E advertises the adjacency segment ID(s) that node assigned to the other nodes in the network.

In response to receiving an advertisement from another node, a node can extract the adjacency segment IDs from that advertisement and add the extracted adjacency segment IDs to a list (e.g., maintained in a table or other appropriate data structure) of adjacency segment IDs currently in use within the SR network. Such a list can subsequently be used when generating appropriate SR segment ID stacks to attach to messages being sent using SR.

Figure 2:
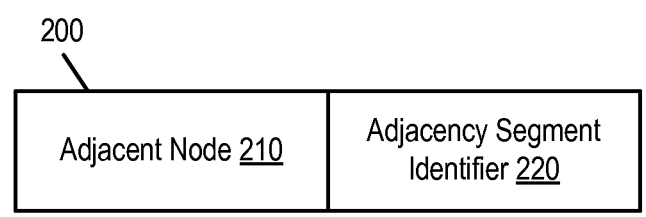
FIG. 2 is a block diagram illustrating an example adjacency segment ID advertisement, according to one embodiment.

FIG. 2 shows a very simplified set of information 200 that can be included in an adjacency advertisement. This adjacency advertisement can be part of a TLV field (e.g., TLV 22) within an IIH message. In this example, a sending node can list each of its adjacent nodes, thus indicating that an adjacency segment exists between the sending node and each of the listed adjacent nodes, as well as the adjacency segment ID assigned by the sending node to that segment. Thus, in the example of FIG. 2, a set of information 200 includes information 210 identifying an adjacent node and information 220 identifying an adjacency segment ID assigned to the adjacency segment between the sending node (which is also identified in the IIH message, e.g., in the sending address) and the adjacent node by the sending node. In some embodiments, this set of information can be included in an IIH message by simply expanding TLV used to indicate adjacencies to include the adjacency segment ID assigned by the sending node. It is noted that a given IIH message can include several sets of information 200, each corresponding to a different adjacency segment and each containing a different adjacency segment ID.

In the example of FIG. 1, where all SR nodes are coupled by point-to-point links, each SR node can simply identify all of its adjacency segments and then send one or more IIH messages identifying those adjacency segments as well as the adjacency segment IDs assigned to those adjacency segments by the sending node. In some embodiments, each IIH message can include information corresponding to multiple different adjacency segments, and thus each SR node can include multiple different assigned adjacency segment IDs in each IIH message. In response to receiving an IIH message from another SR node, an SR node can extract any adjacency segment IDs from the received IIH message and store those IDs in an adjacency segment ID table, which can be used when forwarding SR messages.

Figure 3:
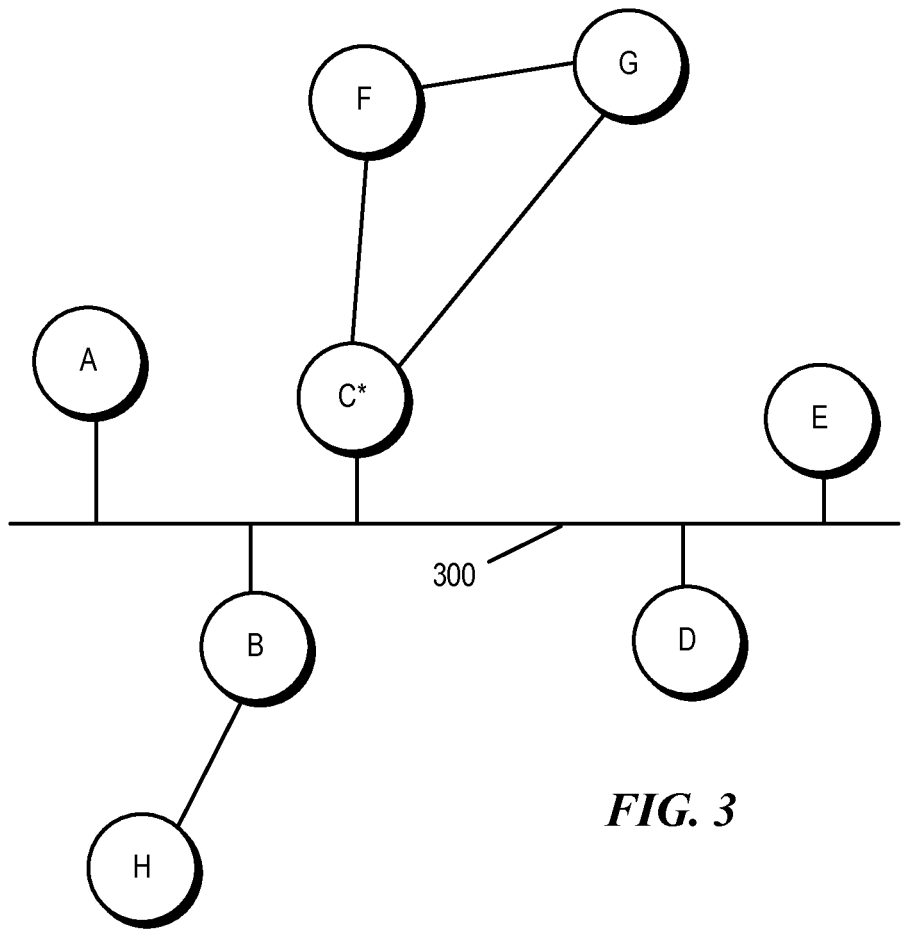
FIG. 3 is a block diagram of an example network that includes a local area network (LAN) segment, according to one embodiment.

FIG. 3 shows a simplified block diagram of a network that includes a LAN 300. Here, nodes A, B, C, D, and E are coupled by LAN 300. Additionally, node C is coupled to nodes F and G by respective point-to-point links, node B is coupled to node H by a point-to-point link, and nodes F and G are coupled by a point-to-point link. All of the nodes are configured to implement SR and thus to assign and advertise adjacency segment IDs.

In some embodiments, all of the nodes can simply advertise all of their assigned adjacency segment IDs in the manner described above. For nodes on LAN 300, adjacencies can be identified between each node and each other node on LAN 300. For example, node A would identify adjacency segments between node A and node B, node A and node C, node A and node D, and node A and node E. Node A could then assign adjacency segment IDs to each of these identified adjacencies and then send an IIH message advertising the assigned adjacency segment IDs to each other node in the SR network, including nodes like nodes F, G, and H that are not coupled to the LAN.

However, in many embodiments, the advertisement of adjacency segment IDs assigned by nodes on a LAN can be simplified, such that fewer than all of the nodes on the LAN advertise adjacency segment IDs assigned within the LAN to nodes outside of the LAN. This can reduce the number of IIH messages that need to be processed by nodes outside of the LAN, which can in turn improve network efficiency.

For example, certain nodes on the LAN can be configured as designated nodes (which can, in some embodiments, be referred to as hubs), while other nodes can be configured as non-designated nodes (which can, in some embodiments, be referred to as spokes). In the example of FIG. 2, node C, which is marked by a *, is the designated node for LAN 300, which the other nodes (A, B, D, and E) are non-designated nodes. In this example, node C is a designated intermediate system (DIS) node as defined in the IS-IS protocol.

Here, each non-designated node can identify an adjacency segment between that node and each of the other nodes on the LAN. Then, the non-designated nodes can assign adjacency segment IDs to the identified adjacency segments. Instead of advertising the assigned adjacency segment IDs to all of the other SR nodes in the network, however, the non-designated nodes can simply advertise their assigned adjacency segment IDs to the designated node. Thus, after identifying all of the adjacency segments and assigning adjacency segment IDs to each, the non-designated nodes A, B, D, and E can each send one or more IIH messages containing the assigned adjacency segment identifiers to the designated node C.

As such, in some embodiments, a non-designated node is configured to send IIH messages that contain adjacency segment IDs assigned by that non-designated node only to the designated node(s) on the same LAN, instead of sending advertisements to all of the nodes (both designated and undesignated, both within and outside of the same LAN segment). Accordingly, in this example, non-designated node A would send an IIH message, containing the adjacency segment IDs assigned by node A, to only designated node C, instead of sending such IIH messages to all of nodes B-H in the SR network.

As node C receives IIH messages from non-designated nodes on the LAN segment, node C can extract the assigned adjacency segment IDs from the IIH messages and add those extracted IDs to a list (e.g., maintained in a table or other appropriate data structure) of adjacency segment IDs for the network. Based on these extracted IDs, Node C can then create a new advertisement (or set of advertisements) containing the set of all of the extracted IDs to all of the other SR nodes A-H in the SR domain. This way, instead of receiving at least one advertisement from each node on the LAN segment, the nodes F, G, and H outside of the LAN segment each only receive one advertisement (or one set of advertisements, if multiple messages are needed to convey the entire list of adjacency segment IDs assigned on the LAN segment), from designated node C, containing all of the adjacency segment IDs assigned on the LAN segment. A node that collects advertised adjacency segment IDs from a set of other nodes and then generates advertisements containing all of the collected adjacency segment IDs is also referred to herein as an aggregator node.

It is noted that some nodes are coupled to both a LAN segment and one or more point-to-point links. These nodes can use one technique (e.g., involving an aggregator node) when advertising adjacency segment IDs for adjacencies on the LAN segment, and another technique (e.g., not involving an aggregator node) when advertising adjacency segment IDs for the point-to-point link(s). An aggregator node for a LAN segment may include both the adjacency segment ID the aggregator node assigned to a point-to-point link as well as the aggregated list of adjacency segment IDs obtained from other nodes on the LAN in the same advertisement, in some embodiments.

Figure 4:
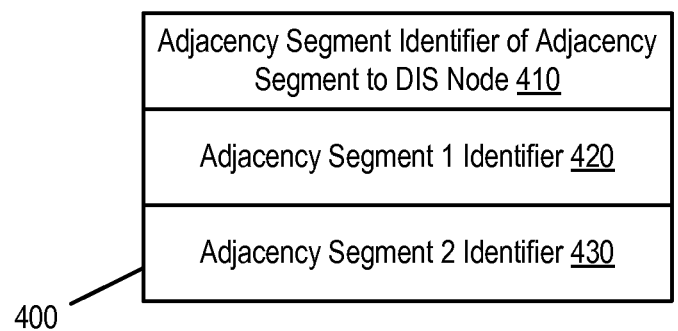
FIG. 4 is a block diagram of an example adjacency segment ID advertisement that can be used to advertise adjacency segment IDs for a LAN segment, in one embodiment.

FIG. 4 is a block diagram of an example of information 400 that can be included in an adjacency segment advertisement (e.g., an IIH message) that can be used to advertise adjacency segment identifiers for a LAN segment. In this example, the information 400 includes the adjacency segment ID 410 assigned by the sending node (i.e., the node sending the advertisement) to the adjacency between the sending node and the designated node (DIS in this example) to which the advertisement is being sent. This ID 410 can, in one embodiment, be sent in an expanded TLV field as described above.

The information 400 also includes the adjacency segment ID (Adjacency Segment 1 ID) 420 assigned to another adjacency by the sending node. Similarly, the information 400 includes the adjacency segment ID (Adjacency Segment 2 ID) 430 assigned to a third adjacency identified by the sending node. In one embodiment, these adjacencies correspond to adjacencies identified between the sending node and other non-designated nodes on the LAN segment. These adjacency IDs can be included within a sub-TLV within the IIH message in some embodiments.

In one embodiment, when a non-designated node sends an IIH message to advertise the adjacency segment IDs assigned by that node, the identity of the adjacencies is implicit by the order in which the adjacency segment IDs are listed within the IIH message. For example, there may be a certain order established between nodes in the LAN (e.g., based upon some identifier associated with each node or upon some other available information usable to distinguish nodes from each other). Each node can list the adjacency segment IDs it assigns in that established order, such that each other node can know what segment each assigned ID corresponds to based upon the identity of the assigning node as well as the order of the IDs within the message.

Figures 5, 6:
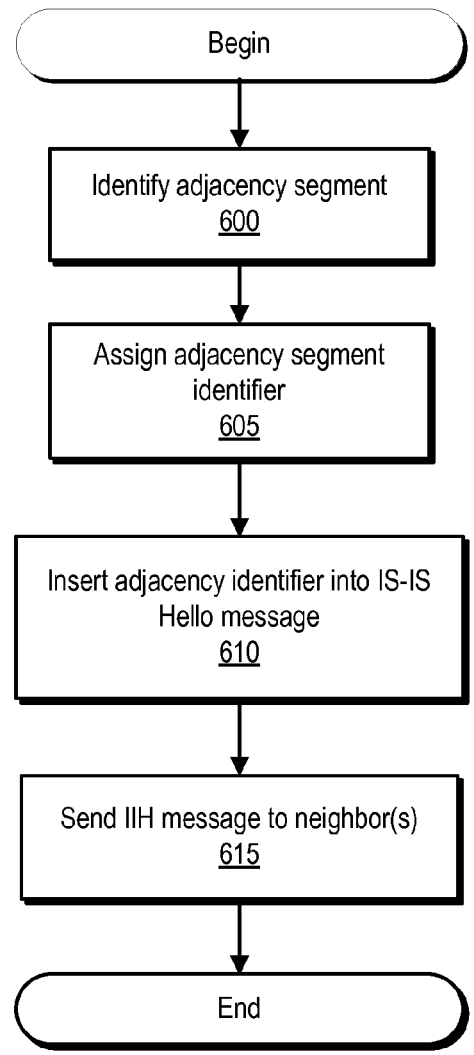
FIG. 5 is a block diagram of an example adjacency segment ID table that a node can maintain, according to one embodiment.
FIG. 6 is a flowchart illustrating how a network node can advertise an adjacency segment ID, in one embodiment.

FIG. 5 is a block diagram of an example adjacency segment ID table 500 that a node can maintain. This table includes both adjacency segment IDs assigned by that node as well as adjacency segment IDs assigned by other nodes. The adjacency segment IDs assigned by other nodes are extracted from adjacency advertisements received by the node. As described above, those adjacency advertisements can be received directly from the node that assigned the IDs contained within the advertisements, or from a node (such as designated node C in FIG. 3) that aggregates IDs generated by a set of other nodes.

For example, assume table 500 is maintained by node 3. The table includes four adjacency segment IDs 501-504. Adjacency segment ID 501 was assigned by node 1 to identify the adjacency between node 1 and node 2. Adjacency segment ID 502 was assigned by node 1 to identify the adjacency between node 1 and node 3. Adjacency segment ID 503 was assigned by node 2 to identify the adjacency between node 2 and node 1. As such, node 3 obtains IDs 501-503 by extracting these IDs from IIH messages sent to advertise the IDs. These IIH messages can either be sent by the nodes that assigned the IDs or by an aggregator node. Table 500 also includes adjacency segment ID 504, which was assigned by node 3 to identify the adjacency between node 3 and node 1.

FIG. 6 is a flowchart illustrating how a network node can advertise an adjacency segment identifier. In this example, the method begins when the node identifies an adjacency segment between the node and another node with which that node can directly send and receive packets (e.g., via a point-to-point link or via a LAN segment), as indicated at 600. A node can identify an adjacency segment using any appropriate networking technique that allows a node to discover a connection to another node.

The node then assigns an adjacency segment ID to the identified adjacency segment, as shown at 605. In some embodiments, nodes assign adjacency segment IDs such that those IDs are locally unique (i.e., such that the same node will not assign two different adjacency segments the same ID), using a prespecified range of values. The node can store (not shown) the assigned adjacency segment ID (as well as any information needed to indicate which adjacency corresponds to that ID) in an adjacency segment ID table or other data structure, which can then be used when creating SR segment stacks.

After assigning the adjacency segment ID, the node inserts the assigned adjacency segment ID (and any other information needed to indicate which adjacency is being identified by that ID, if such information is not already implicit (e.g., due to an order of IDs)) into an IIH message, as shown at 610. It is noted that several different adjacency segment IDs can be inserted into the same IIH message. The node then sends the IIH message containing the adjacency segment ID assigned by that node to one or more other nodes, as shown at 615.

Returning to FIG. 3, it is noted that in certain LAN segment configurations, it may be desirable to further refine how adjacency segment IDs are assigned and advertised. In particular, in certain LAN configurations (e.g., in certain subscriber networks), certain nodes act as hubs, while other nodes act as spokes. In these network configurations, message traffic only flows from hubs to spokes and/or vice versa. In other words, there is no message traffic between different spokes on the LAN; instead, all traffic flows to and/or from a hub.

In these configurations, since there is no message communication between spokes, there is no need to identify adjacencies between spokes or to assign adjacency segment IDs to such adjacencies, since such adjacencies cannot be used to convey messages. Thus, in order to reduce the time and resources spent generating and advertising adjacency segment IDs in such configurations, nodes on a LAN segment can be configured to only assign adjacency segment IDs to adjacencies that include at least one hub node at either end. As such, a hub node, like designated node C in FIG. 3, will assign and advertise adjacency segment IDs for adjacencies to all of the other nodes A, B, D, and E on the LAN segment, since node C is a hub. However, the remaining spoke nodes will only assign and advertise adjacency segment IDs between themselves and the hub node C. Thus, nodes A, B, D, and E will each only assign and advertise a single adjacency segment ID.

Figure 7:
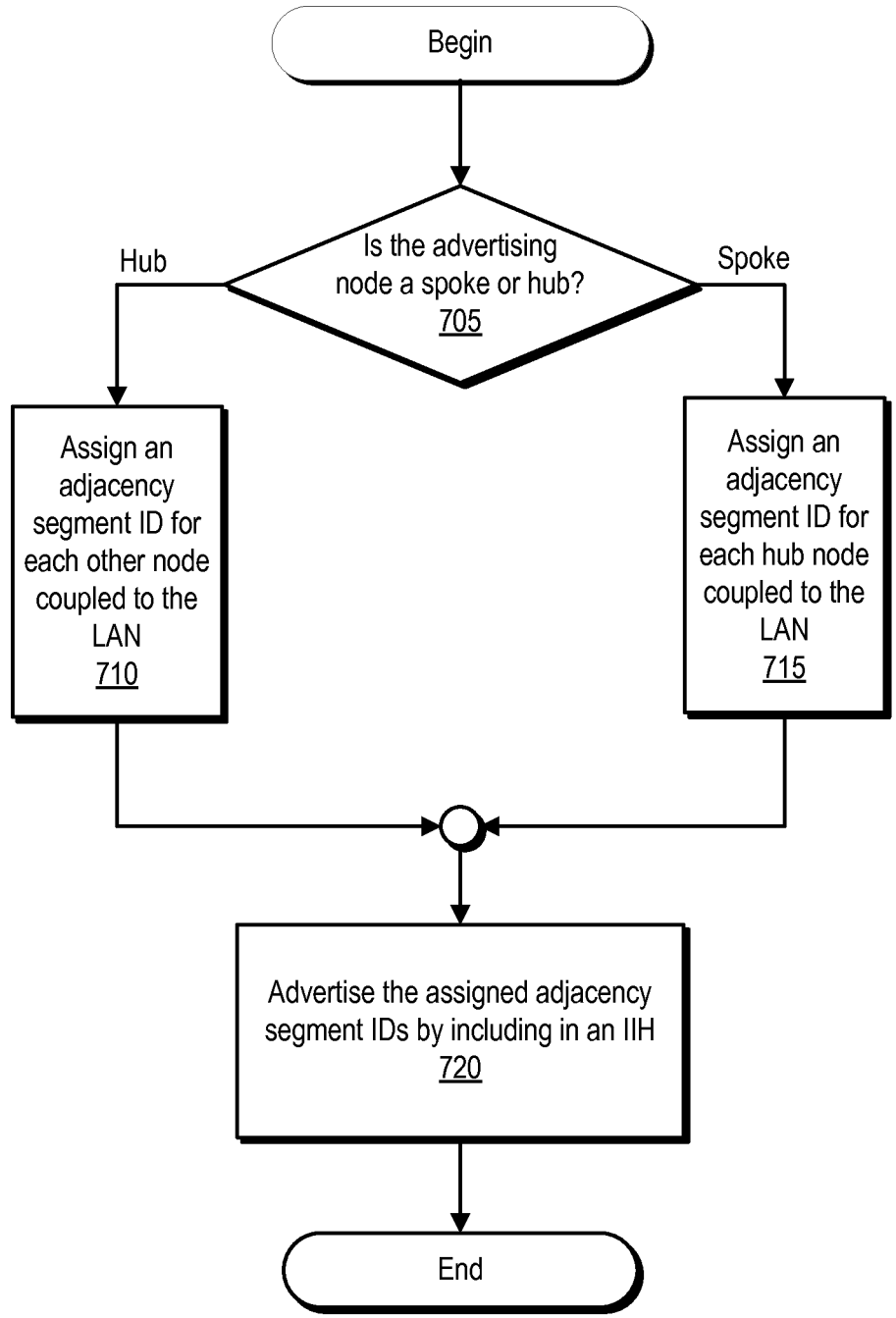
FIG. 7 is a flowchart illustrating how a network node can advertise an adjacency segment ID for a LAN segment, in one embodiment.

FIG. 7 is a flowchart illustrating how a network node can advertise an adjacency segment identifier for a LAN segment in which traffic is not allowed between spoke nodes. As described above, this method controls how adjacency segment IDs are assigned, so that IDs are not assigned to adjacencies between a pair of spoke nodes.

The method begins at 705, when the advertising node identifies whether it is a hub node or a spoke node. In some embodiments, this determination is based upon a priority value assigned to the node. For example, priority values in the range of 0 to 32 identify spoke nodes, while priority values in the range of 33 to 64 identify hub nodes. Any other appropriate technique can also be used.

If the node performing the method of FIG. 7 is a hub node, that node will identify an adjacency segment between itself and each other node on the same LAN segment. The node will then assign an adjacency segment ID to each of the identified adjacencies, as indicated at 710.

If instead the node performing the method is a spoke node, that node will only identify the adjacency segment(s) between itself and any hub node(s) on the LAN segment. The node will assign an adjacency segment ID to each identified adjacency, as shown at 715, but will not assign an adjacency segment ID to adjacencies between itself and any spoke nodes.

At 720, the node performing the method will send an advertisement (e.g., an IIH message) containing the adjacency segment ID(s) assigned by that node to one or more other SR nodes. The refinement used in these hub-and-spoke LAN configurations can be combined with the refinement that allows an aggregator node on a LAN to aggregate all of the advertisements on the LAN. Thus, a hub node (or other node designated as the aggregator node for the LAN) can collect all advertisements from all of the other nodes on the LAN, extract the advertised adjacency segment IDs from those advertisements, and then advertise the entire set (from all of the other nodes on the LAN) of adjacency segment IDs for the LAN to SR nodes outside of the LAN. Accordingly, in FIG. 7, if the node performing the method is an aggregator node, the advertisement sent at 720 can also include the adjacency segment IDs collected from other nodes.

In embodiments in which messages are not conveyed between spoke nodes on a LAN segment and in which there is an aggregator node, instead of controlling how the adjacency segment IDs are assigned (such that spoke nodes do not assign IDs to adjacencies between themselves and other spoke nodes, as shown in FIG. 7), the aggregator node can instead be configured to filter out certain IDs before advertising the aggregated set of IDs to all of the SR nodes, including those external to the LAN segment. Thus, the aggregator node can remove all of the adjacency segment IDs that were assigned to adjacencies between pairs of spoke nodes, leaving only adjacencies between hubs and hubs and hubs and spokes.

Figure 8:
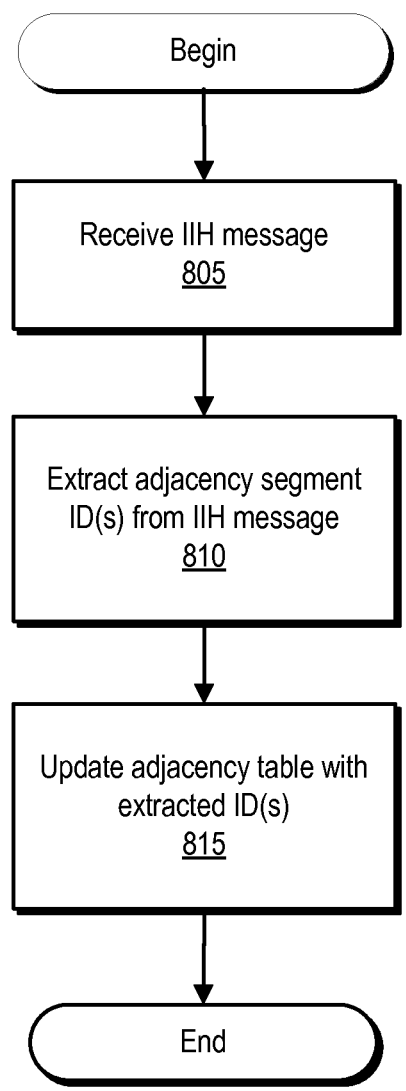
FIG. 8 is a flowchart illustrating how a network node can extract adjacency segment IDs assigned by another node from an advertisement, according to one embodiment.

FIG. 8 is a flowchart illustrating how a node can obtain adjacency segment IDs assigned by other nodes. As shown, at 805 the node receives an IIH message being used to advertise adjacency segment IDs. At 810, the node extracts the adjacency segment IDs from the IIH message. The node then adds the extracted adjacency segment IDs (and any other information needed to indicate which adjacency has been assigned that ID) to an adjacency segment ID table, as shown at 815.

Figure 9:
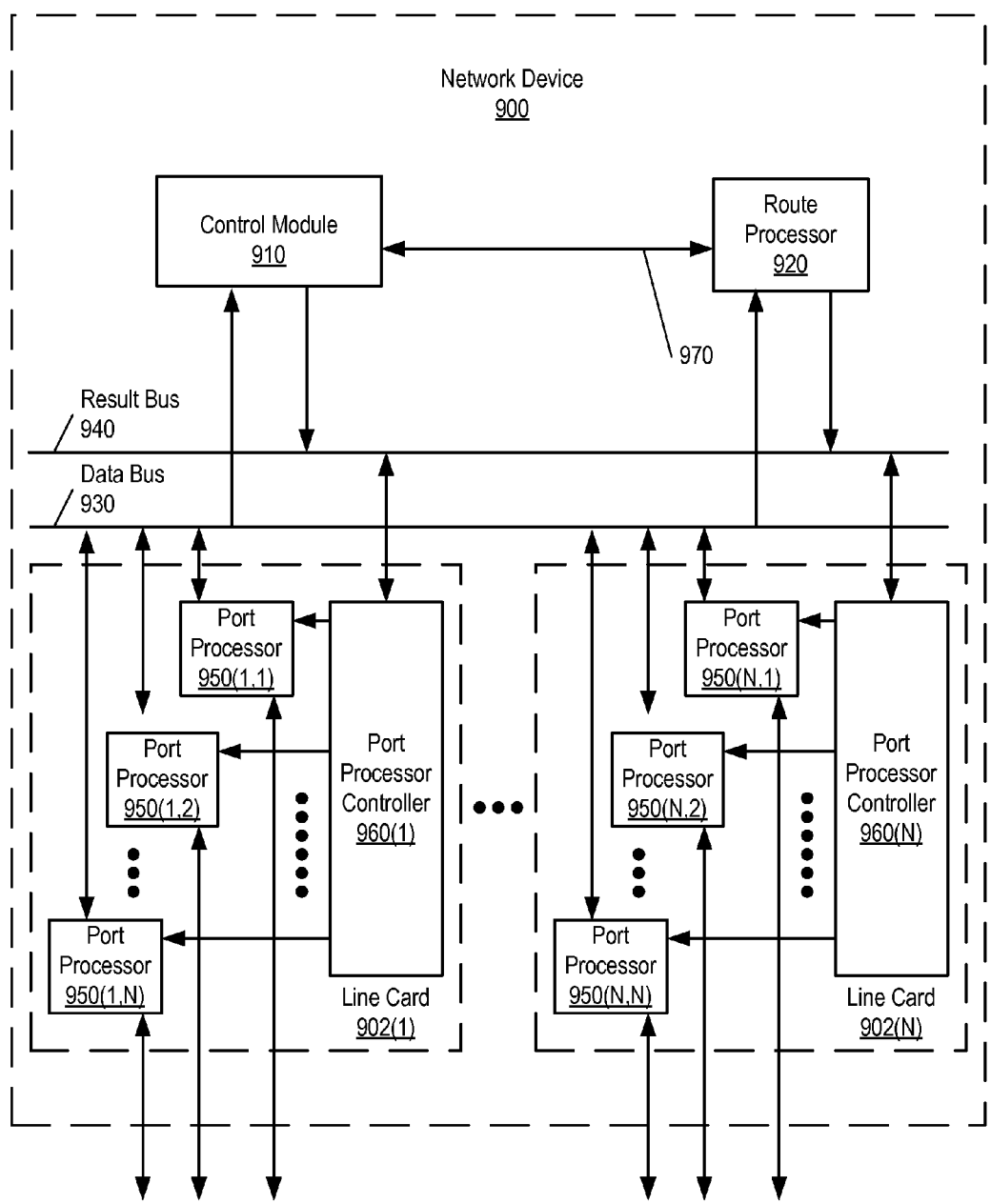
FIG. 9 is a block diagram illustrating certain components of an example node that can be employed in the network of FIG. 1 or 3 in one embodiment.

FIG. 9 is a block diagram of a network device 900 (e.g., one of the network nodes A-E of FIG. 1 or nodes A-H of FIG. 3). In this depiction, network device 900 includes a number of line cards (line cards 902(1)-902(N)) that are communicatively coupled to a control module 910 (which can include a forwarding engine, not shown) and a route processor 900 via a data bus 930 and a result bus 940. Line cards 902(1)-(N) include a number of port processors 950(1,1)-950(N,N) which are controlled by port processor controllers 960(1)-960(N). It will also be noted that control module 910 and route processor 900 are not only coupled to one another via data bus 930 and result bus 940, but are also communicatively coupled to one another by a communications link 970. In alternative embodiments, each line card can include its own forwarding engine.

When a message (e.g., an IIH message) is received, the message is identified and analyzed by a network device such as network device 900 in the following manner. Upon receipt, a message (or some or all of its control information) is sent from one of the port processors 950(1,1)-950(N,N) at which the message was received to one or more of those devices coupled to data bus 930 (e.g., others of port processors 950(1,1)-950(N,N), a forwarding engine, and/or route processor 900). Handling of the message can be determined, for example, by a forwarding engine. For example, a forwarding engine may determine that the message should be forwarded to one or more of port processors 950(1,1)-950(N,N). This can be accomplished by indicating to corresponding one(s) of port processor controllers 960(1)-960(N) that the copy of the message held in the given one(s) of port processors 950(1,1)-950(N,N) should be forwarded to the appropriate one of port processors 950(1,1)-950(N,N). In this example, the functionality described above with respect to FIGS. 5-8 can be implemented in control module 910 and/or route processor 920.

Figure 10:
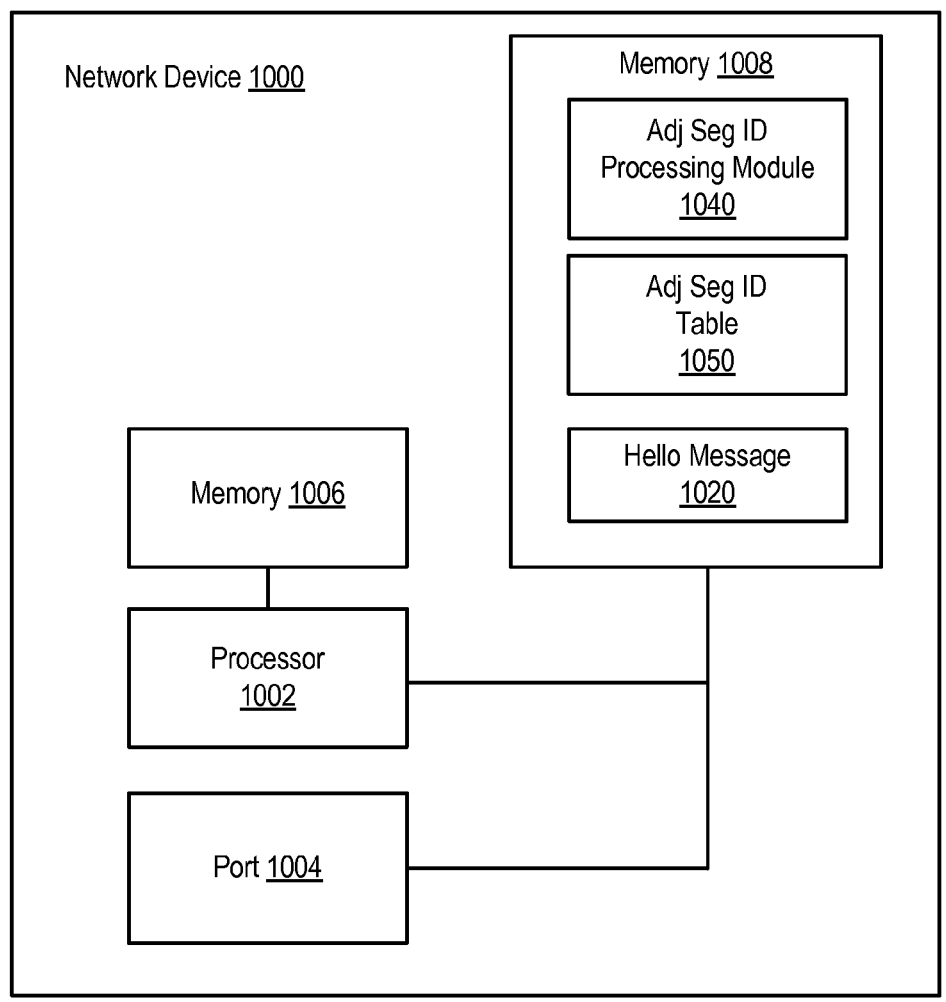
FIG. 10 is a block diagram illustrating how certain components of a network node can be implemented in software in one embodiment.

FIG. 10 is a block diagram of a network device 1000 (e.g., one of the network nodes A-E of FIG. 1 or nodes A-H of FIG. 3). As illustrated, network device 1000 includes one or more processors 1002 (e.g., microprocessors, PLDs (Programmable Logic Devices), or ASICs (Application Specific Integrated Circuits)) configured to execute program instructions stored in memories 1006 and/or 1008. Memories 1006 and 1008 can include various types of RAM (Random Access Memory), ROM (Read Only Memory), Flash memory, MEMS (Micro Electro-Mechanical Systems) memory, and the like. Network device 1000 also includes one or more ports 1004 (e.g., one or more hardware ports or other network interfaces that can be linked to other network devices, hosts, servers, storage devices, or the like). Processor 1002, port 1004, and memories 1006 and 1008 are coupled to send and receive data and control signals by one or more buses or other interconnects.

In this example, program instructions executable to implement an adjacency segment ID ("Adj Seg ID") processing module, which can be configured to perform all or some of the functionality discussed above with respect to FIGS. 5-8, are stored in memory 1008. Memory 1008 can also store all or part of an IS-IS Hello message 1020 (or other appropriate link state message) containing adjacency segment IDs assigned by an SR node, as well as an adjacency segment ID ("Adj Seg ID") table in which adjacency segment IDs assigned by network device 1000 and/or extracted from one or more IIH messages are stored.

The program instructions and/or data executable to implement timestamp processing specified by a protocol can be stored on various computer readable storage media such as a memory (e.g., RAM (Random Access Memory)). In some embodiments, such software is stored on a computer readable storage medium such as a CD (Compact Disc), DVD (Digital Versatile Disc), hard disk, optical disk, tape device, floppy disk, and the like. In order be executed, the software is loaded into memory from another computer readable storage medium. The instructions and/or data can also be transferred to a computing device for storage in memory via a network such as the Internet or upon a carrier medium. In some embodiments, the instructions and/or data are conveyed using a carrier medium such as a network and/or a wireless link upon which signals such as electrical, electromagnetic, or digital signals.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    identifying an adjacency segment between a first node and a second node, wherein the identifying is performed by the first node;
    assigning an adjacency segment identifier (ID) to the adjacency segment, wherein
        the assigning is performed by the first node, and
        the adjacency segment ID is locally significant to the first node;
    sending an Intermediate-System-to-Intermediate-System (IS-IS) hello (IIH) message to a third node, wherein
        the first node and the third node are both on a local area network (LAN),
        the sending is performed by the first node,
        the IIH message comprises the adjacency segment ID, and
        the third node is configured to aggregate a plurality of adjacency segment IDs generated by a set of nodes;
    determining whether the first node comprises a spoke node or a hub node; and
    in response to determining that the first node comprises the spoke node:
        assigning, by the first node, a respective adjacency segment ID for an adjacency with a hub node that is coupled to the LAN; and
        inhibiting assignment of any adjacency segment ID for an adjacency with an additional spoke node coupled to the LAN.

2. The method of claim 1, wherein the adjacency segment is a point-to-point segment.

3. The method of claim 1, wherein
    the third node is a designated intermediate system (DIS) for the LAN.

4. The method of claim 3, wherein the IIH message comprises a plurality of sub-type length value (TLV) fields, and wherein each of the sub-TLV fields is associated with a respective adjacency segment between the first node and a respective adjacent node of a plurality of nodes coupled to the LAN.

5. The method of claim 3, further comprising receiving a message from the DIS comprising a plurality of adjacency segment identifiers, wherein the plurality of adjacency segment identifiers are assigned by one or more other nodes coupled to the LAN.

6. The method of claim 3, further comprising:
in response to determining that the first node comprises the hub node, assigning a respective adjacency segment ID for each adjacency to a plurality of other nodes coupled to the LAN, wherein
at least one of the plurality of other nodes comprises the hub node,
at least one of the plurality of other nodes comprises the spoke node, and wherein
the IIH message comprises all of the assigned respective adjacency segment IDs.

7. The method of claim 1, wherein
the first node and the second node are configured to implement segment routing.

8. A network node comprising:
a port, wherein the port is configured to be coupled to an additional node;
an adjacency segment ID processing module coupled to the port, wherein the adjacency segment ID processing module is configured to:
identify an adjacency segment between the network node and a second node;
assign an adjacency segment identifier (ID) to the adjacency segment, wherein
the adjacency segment ID is locally significant to the network node;
send an Intermediate-System-to-Intermediate-System (IS-IS) hello (IIH) message to the additional node via the port, wherein
the IIH message comprises the adjacency segment ID,
the additional node is configured to aggregate a plurality of adjacency segment IDs generated by a set of nodes, and
the network node and the additional node are both on a local area network (LAN);
detect whether the network node comprises a spoke node or a hub node; and
in response to detecting that the network node comprises the spoke node:
assign a respective adjacency segment ID for an adjacency with a hub node that is coupled to the LAN, and
inhibit assignment of any adjacency segment ID for an adjacency with an additional spoke node coupled to the LAN.

9. The network node of claim 8, wherein the adjacency segment is a point-to-point segment.

10. The network node of claim 8, wherein
the additional node is a designated intermediate system (DIS) for the LAN.

11. The network node of claim 10, wherein the IIH message comprises a plurality of sub-type length value (TLV) fields, and wherein each of the sub-TLV fields is associated with a respective adjacency segment between the network node and a respective adjacent node of a plurality of nodes coupled to the LAN.

12. The network node of claim 10, further comprising receiving a message from the DIS comprising a plurality of adjacency segment identifiers, wherein the plurality of adjacency segment identifiers are assigned by one or more other nodes coupled to the LAN.

13. The network node of claim 10, wherein the adjacency segment ID processing module is further configured to:
in response to detecting that network node comprises a hub node, assign a respective adjacency segment ID for each adjacency to a plurality of other nodes coupled to the LAN, wherein
at least one of the plurality of other nodes comprises the hub node,
at least one of the plurality of other nodes comprises the spoke node, and wherein
the IIH message comprises all of the assigned respective adjacency segment IDs.

14. The network node of claim 8, wherein
the network node is configured to implement a segment routing protocol.

15. A network node comprising a processor configured with instructions stored in memory to perform operations comprising:
identifying an adjacency segment between the network node and a second node;
assigning an adjacency segment identifier (ID) to the adjacency segment,
wherein the adjacency segment ID is locally significant to the network node; and
sending an Intermediate-System-to-Intermediate-System (IS-IS) hello (IIH) message to a third node, wherein the IIH message comprises the adjacency segment ID, and
the third node is configured to aggregate a plurality of adjacency segment IDs generated by a set of nodes, and
the network node and the third node are both on a local area network (LAN);
determining whether the network node comprises a spoke node or a hub node; and in response to detecting that the network node comprises the spoke node;
assigning a respective adjacency segment ID for an adjacency with a hub node that is coupled to the LAN, and
inhibit assignment of any adjacency segment ID for an adjacency with an additional spoke node coupled to the LAN.

16. The network node of claim 15, wherein the adjacency segment comprises a point-to-point segment.

17. The network node of claim 15, wherein the third node comprises a designated intermediate system (DIS) for the LAN.

18. The network node of claim 15, wherein:
the IIH message comprises a plurality of sub-type length value (TLV) fields; and
each of the sub-TLV fields is associated with a respective adjacency segment between the network node and a respective adjacent node of a plurality of nodes coupled to the LAN.

19. The network node of claim 15, the operations further comprising receiving a message from the DIS comprising a plurality of adjacency segment identifiers, wherein the plurality of adjacency segment identifiers are assigned by one or more other nodes coupled to the LAN.

20. The network node of claim 15, the operations further comprising:
in response to detecting that network node comprises a hub node, assigning a respective adjacency segment ID for each adjacency to a plurality of other nodes coupled to the LAN, wherein:
at least one of the plurality of other nodes comprises the hub node;
at least one of the plurality of other nodes comprises the spoke node; and the IIH message comprises all of the assigned respective adjacency segment IDs.

\* \* \* \* \*